United States Patent
Mueller et al.

(10) Patent No.: US 6,168,112 B1
(45) Date of Patent: Jan. 2, 2001

(54) DOUBLE PANE WINDOW FOR AN AIRCRAFT CABIN

(75) Inventors: Rainer Mueller, Rosengarten; Sven Uhlemann, Uetersen; Thomas Scherer, Hamburg; Heiko Luetjens, Pinneberg, all of (DE)

(73) Assignee: DaimlerChrysler Aerospace Airbus GmbH, Hamburg (DE)

( * ) Notice: Under 35 U.S.C. 154(b), the term of this patent shall be extended for 0 days.

(21) Appl. No.: 09/249,460

(22) Filed: Feb. 12, 1999

(30) Foreign Application Priority Data

Feb. 14, 1998 (DE) .............................................. 198 06 107
Feb. 14, 1998 (DE) .............................................. 198 06 106

(51) Int. Cl.⁷ ...................................................... B64C 1/14
(52) U.S. Cl. ...................................... 244/129.3; 52/786.1
(58) Field of Search ........................ 244/129.3; 49/475.1; 52/786.1, 788.1

(56) References Cited

U.S. PATENT DOCUMENTS

| | | | |
|---|---|---|---|
| 2,117,581 | * 5/1938 | Stoneback ...................... | 52/786.1 X |
| 2,189,388 | 2/1940 | Zand . | |
| 2,302,740 | 11/1942 | Boicey . | |
| 2,320,069 | * 5/1943 | Cresswell et al. .................. | 52/786.1 |
| 5,884,865 | 3/1999 | Scherer et al. . | |

FOREIGN PATENT DOCUMENTS

| | | |
|---|---|---|
| 647307 | 7/1937 | (DE) . |
| 933371 | 9/1955 | (DE) . |

* cited by examiner

Primary Examiner—Robert P. Swiatek
(74) Attorney, Agent, or Firm—W. F. Fasse; W. G. Fasse

(57) ABSTRACT

A double pane window for an aircraft cabin has a passive air dehumidifying channel (5, 5A) that is in heat exchange contact with a window metal frame (1) which is in turn in heat exchange contact with the atmosphere outside the aircraft. The air dehumidifying channel (5, 5A) communicates through a first air flow port (6) with the cabin space and through a second air flow port (7) with a space enclosed between the double panes.

14 Claims, 3 Drawing Sheets

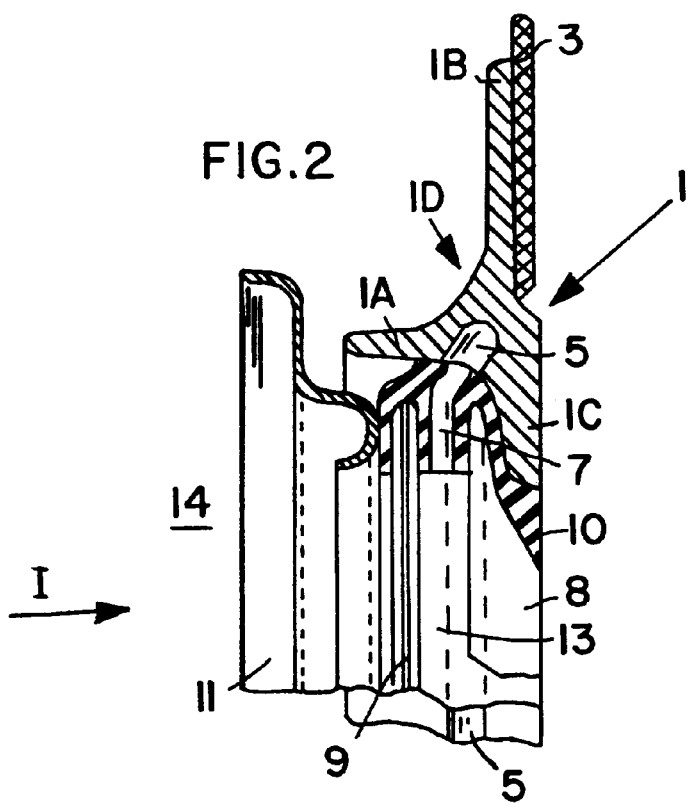
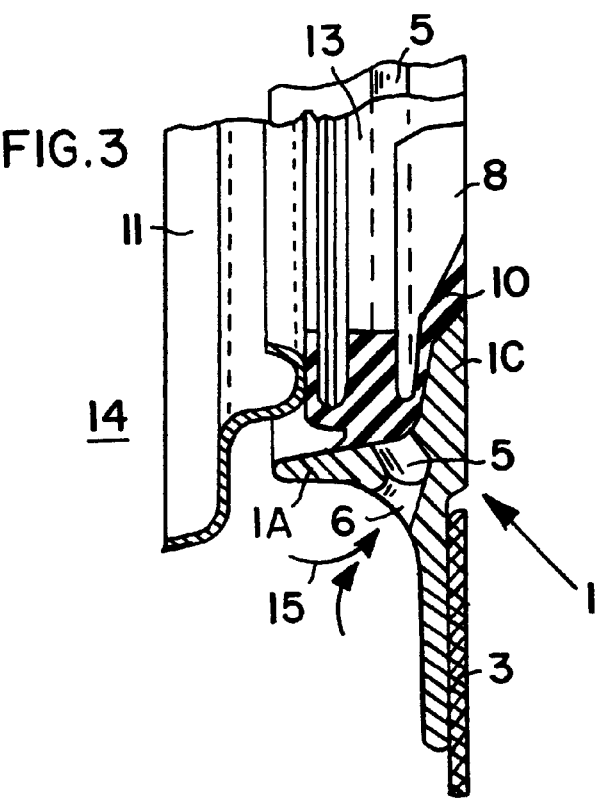

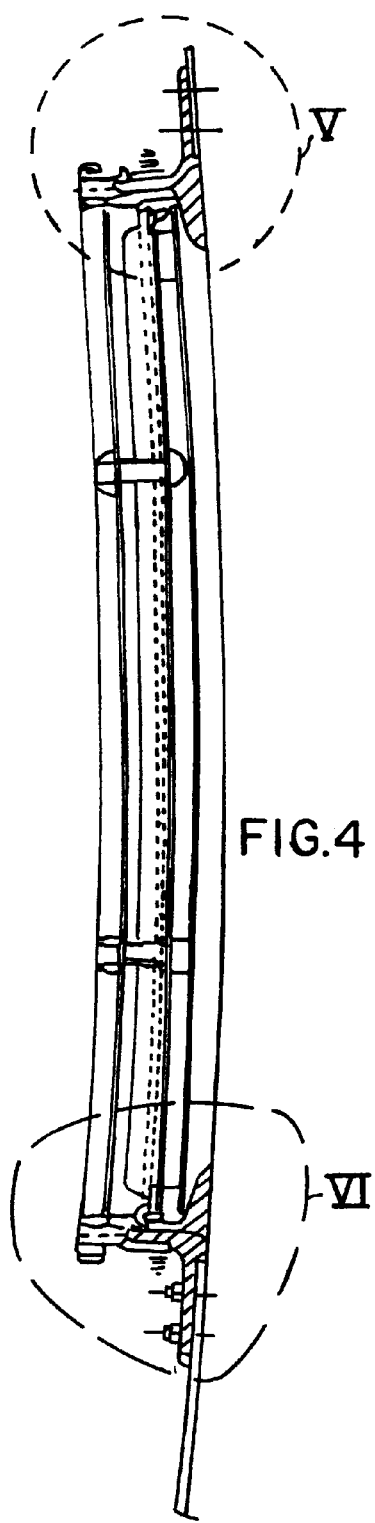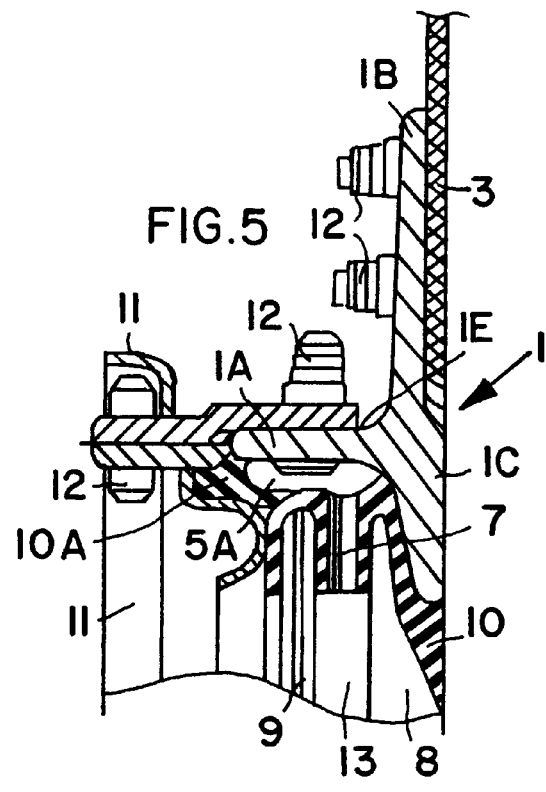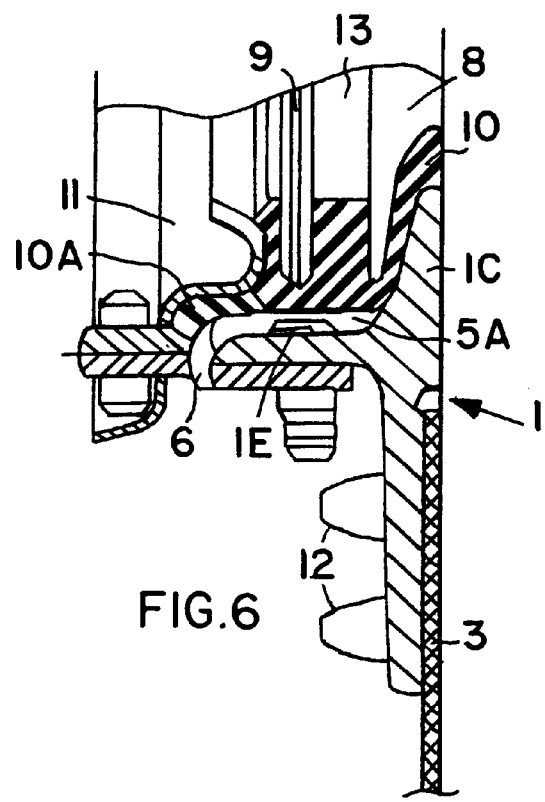

DOUBLE PANE WINDOW FOR AN AIRCRAFT CABIN

CROSS REFERENCE TO RELATED APPLICATION

The present disclosure is related to the disclosure of U.S. Ser. No. 08/984,605, filed Dec. 3, 1997 for "Non-Fogging Aircraft Window Arrangement", now U.S. Pat. No. 5,884,865.

PRIORITY CLAIM

This application is based on and claims the priority under 35 U.S.C. §119 of German Patent Applications 198 06 106.4 and 198 06 107.2, both filed on Feb. 14, 1998, the entire disclosures of which are incorporated herein by reference.

FIELD OF THE INVENTION

The invention relates to the construction of aircraft cabin windows having double panes with a spacing between the panes. The construction shall avoid fogging of the pane surfaces facing the space between the panes.

BACKGROUND INFORMATION

Efforts to defog the space between double window panes have been made over a long period of time. For example, German Patent 647,347 (Kruckenberg), published in 1937, suggests to hermetically seal the space between the panes in an airtight manner and to compensate for pressure differentials between the space and the outside by connecting the space to a flexible rubber bag, the volume of which is elastically variable to compensate for such pressure differentials to prevent breakage of the window panes.

U.S. Pat. No. 2,189,388 (Zand), published Feb. 6, 1940, discloses an aircraft double pane window construction in which the space between the panes is vented to the atmosphere outside the aircraft. The air between the panes is dried by causing the air to flow through a moisture absorbing material such as calcium chloride or silica gel contained in a canister (11).

U.S. Pat. No. 2,302,740 (Boicey), Published on Nov. 24, 1942, discloses double pane aircraft windows with a venting fitting specially placed to avoid damage to the inner glass pane. The fitting connects the vent to a suction device for withdrawing air from the space between the panes or for causing dehydrated air or heated air to circulate through the space between the window panes.

German Patent 933,371 (Götz), published Sep. 22, 1955, discloses double pane windows with an air dryer cartridge reaching into the space between the panes. Additionally, a pipe passing through the cartridge vents the space between the panes to the space inside the cabin.

The above prior art leaves room for improvement, especially with regard to economically dehumidifying the air entering from the cabin into the space between the panes. Even if the cabin air itself is relatively dry, fogging may occur nevertheless because the temperature on the inner surface of the outer pane may, for example, be about −20° C. while the temperature on the outside of the aircraft may, for example, be −30° C. or colder at high altitudes.

OBJECTS OF THE INVENTION

In view of the foregoing it is the aim of the invention to achieve the following objects singly or in combination:

to condition the air entering into the space between the panes from the cabin space without any additional structural components outside the window itself and without the use of an active power operated pressure control system;

to prevent fogging and icing of the window panes by a passive air conditioning device that substantially does not require window components in addition to those presently forming aircraft cabin windows except for an auxiliary seal, if necessary;

to modify present window components in such a way that air entering into the space between the panes is dehumidified by using the cold temperatures outside an aircraft for the dehumidifying; and to guide air flowing from the cabin into the space between the panes into contact with a cold window frame component before the air enters into the space between the panes.

SUMMARY OF THE INVENTION

An aircraft cabin window with double panes having a space between the panes is characterized according to the invention by a metal frame that has a flange section for securing the metal frame to a fuselage wall, more specifically to the outer fuselage wall for heat exchange contact with the fuselage wall and thus with the atmosphere outside the aircraft. The metal frame further includes a mounting section in heat exchange contact with the flange section. The mounting section extends away from the flange section inwardly toward the space inside the cabin. At least one main sealing section secures the window panes to the metal frame so that the above mentioned space is provided between the panes. An air dehumidifying channel is positioned in heat exchange contact with the metal frame. A first air flow port communicates the air dehumidifying channel with the cabin space and a second air flow port communicates the air dehumidifying channel with the space between the window panes.

When humid air flows from the cabin through the first air flow port and then along the dehumidifying channel, humidity will be condensed along the dehumidifying channel due to its low temperature resulting from the heat exchange with the metal frame that in turn is in heat exchange with the exterior of the aircraft. Any condensation water is collected in the channel which is so positioned that the condensation water must flow by gravity through and out of the first air flow port into a collection container.

Advantages of the invention are seen in that an active power consuming pressure control system or air conditioning system is not required. Further, the space between the panes is reliably supplied with dried air. Currently existing double pane aircraft windows can be easily modified for the present purposes with insignificant efforts and expense. Merely the sealing strip or the window frame need to be changed for the present purposes. These changes do not increase the aircraft weight and the air conditioning does not require any extra energy. Even the passenger comfort is increased when the passenger's view through the window is not hampered by fogging.

BRIEF DESCRIPTION OF THE DRAWINGS

In order that the invention may be clearly understood it will now be described in connection with example embodiments, with reference to the accompanying drawings, wherein:

FIG. 2 is a sectional view along section line II—II in FIG. 1 illustrating the air dehumidifying channel as a groove in the metal window frame and showing the second air flow port at the top of the window frame;

FIG. 3 is a view along section line III—III in FIG. 1, illustrating the position of the first air flow port at the bottom of the window frame;

FIG. 4 is a sectional view along section line IV—IV in FIG. 1, however illustrating a modified embodiment of the present air conditioning channel in an aircraft window;

FIG. 5 is a sectional view on an enlarged scale of the portion V in FIG. 4 showing the position of the air conditioning channel; and FIG. 6 is a sectional view on an enlarged scale, of the portion VI in FIG. 4 also showing the position of the air conditioning channel.

Figure 1:
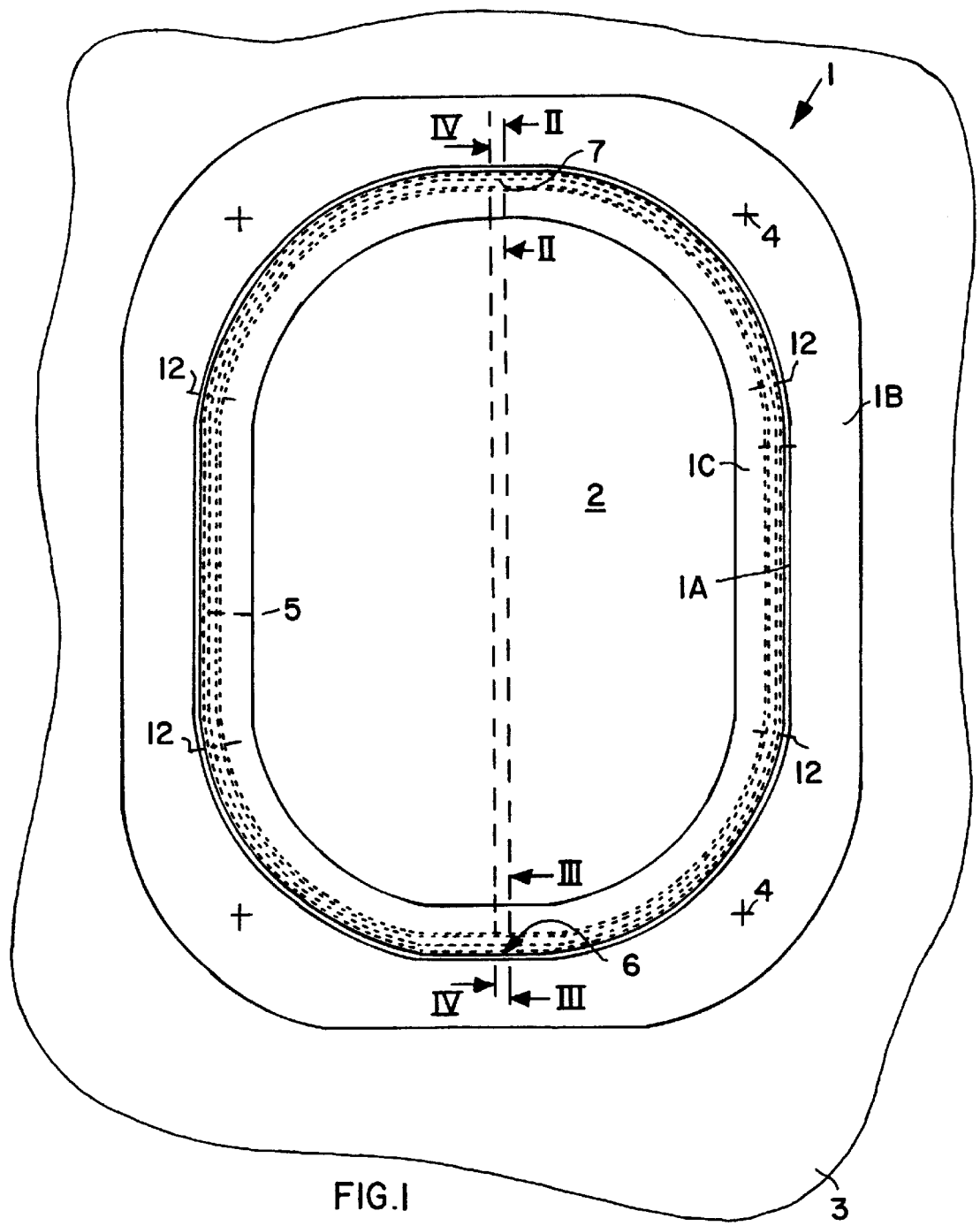
FIG. 1 is a plane view of a cabin window from the inside out as indicated by the arrow I in FIG. 2, but with certain window components omitted to show the metal frame.

DETAILED DESCRIPTION OF PREFERRED EXAMPLE EMBODIMENTS AND OF THE BEST MODE OF THE INVENTION

FIG. 1 illustrates the position of the window metal frame 1 in an opening 2 in the outer fuselage wall 3. An inner hold down frame, a main sealing strip and the window panes seen in FIG. 2 have been omitted in FIG. 1. The metal frame 1 has a mounting section 1A and a flange section 1B. The flange section 1B is secured to the fuselage wall 3 in heat exchange contact with the fuselage wall 3 by conventional connecting elements symbolically shown at 4, for cooling the flange section 1B. The mounting section 1A extends toward the viewer and confines the main sealing strip as seen in FIG. 2. The metal frame 1 also has a rim 1C against which the main sealing strip or section is pressed by the hold down frame, as will be described in more detail below.

According to the invention an air dehumidifying channel 5 is provided in heat exchange contact with the metal frame 1. The channel 5 is shown by dashed lines in FIG. 1 and surrounds the rim 1C of the frame 1. A first air flow port 6 into the channel 5 is shown at the bottom of the window. The first air flow port 6 does not lead directly into a space between the window panes shown in FIG. 2. A second air flow port 7 is shown at the top of the window and leads into the space between the window panes. The first air flow port 6 communicates the air dehumidifying channel 5 with the cabin space while the second air flow port 7 communicates the channel 5 with the space between the window panes.

Referring to FIGS. 2 and 3 in conjunction, a first outer window pane 8 and a second inner window pane 9 are held in place in the metal frame 1 by the above mentioned main sealing strip which is a rubber elastic sealing profile or section 10 forming a main seal which is pressed with the panes 8 and 9 against the contour of the metal frame 1 by the inner hold-down frame 11. The hold-down frame is held by conventional holding elements 12, not shown in FIGS. 2 and 3, but seen in FIG. 5, for example. The window panes 8 and 9 enclose a space 13 which is sealed against the frame 1 and thus against the air conditioning channel or groove 5 by the sealing profile 10, except where the second air flow port 7 communicates the channel or groove 5 with the space 13 as shown in FIG. 2.

FIG. 3 shows that the first air flow port 6 communicates the cabin space 14 with the channel or groove 5. However, the bottom of the space 13 is sealed off from the port 6. Air 15 can thus flow through the port 6 into and along the channel or groove 5, where the air 15 is air conditioned by heat exchange contact with the metal frame 1. The flange section 1B of the frame 1 is in heat exchange contact with the fuselage wall 3 as mentioned above and the rim section 1C of the frame 1 is in direct heat exchange contact with the atmosphere outside the aircraft. Condensation water that may flow out of the port 6 is collected in a container not shown.

As seen in FIGS. 2 and 3, the air conditioning channel or groove 5 is positioned in a junction 1D where the sections 1A, 1B and 1C of the metal frame 1 are joined together. Further, the channel or groove 5 is tilted toward the section 1C and the outside of the fuselage for an improved heat exchange since the section 1C is directly exposed to the temperatures outside the aircraft.

FIG. 4 merely illustrates the positions of the portions V and VI which are shown on an enlarged scale in FIGS. 5 and 6 in which the same reference numbers as in FIGS. 2 and 3 are used for the same elements, except that the air conditioning channel in FIGS. 5 and 6 has reference character 5A because it is positioned between the mounting section 1A and the main sealing section 10. Thus, the channel 5A is in heat exchange contact with the mounting section 1A. An auxiliary seal 10A is positioned between the hold down frame 11 and the channel 5A. If practical, the auxiliary seal 10A could be an integral portion of the main sealing section 10.

The radially inwardly facing surface of the mounting section 1A is the heat exchange surface for the channel 5A. This heat exchange surface is preferably provided with surface area increasing elements 1E that reach into the channel 5A for an improved air conditioning.

Except for the different configuration and position of the channel 5 in FIGS. 2 and 3 as compared to channel 5A in FIGS. 5 and 6, the air conditioning function and the flow conditions are the same in both instances, because the moist air flow port 6 is positioned as far away from the second air flow port 7 as possible in both instances. As is seen from FIG. 1 the ports 6 and 7 are positioned at opposite ends of the window, whereby the first port 6 for the warm air is positioned lower than the second port 7 so that the warm air has a tendency to rise up in the channels 5, 5A and then to enter as dry air through the port 7 into the space 13 between the panes 8 and 9. On its way along the channel 5, 5A the air is conditioned and any condensation water flows down along the channel walls and out through port 6. For this purpose the port 6 preferably has a flow cross-sectional area that is at least equal to or larger than the flow cross-sectional area of the second port 7.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A double pane window for installation in an opening (2) of an aircraft fuselage wall (3) enclosing an aircraft cabin space (14), said window comprising a metal frame (1) including a flange section (1B) for securing said metal frame (1) to said fuselage wall (3) in heat exchange contact with said fuselage wall, said metal frame (1) further including a mounting section (1A) in heat exchange contact with said flange section (1B), said mounting section (1A) extending from said flange section (1B) inwardly toward said cabin space (14), first and second window panes (8, 9), at least one main sealing section (10) securing said first and second window panes (8, 9) to said metal frame (1) with a space

(13) between said first and second window panes (8, 9), an air dehumidifying channel (5, 5A) in heat exchange contact with said metal frame (1), a first air flow port (6) for communicating said air dehumidifying channel (5, 5A) with said cabin space (14), and a second air flow port (7) communicating said air dehumidifying channel (5, 5A) with said space (13) between said first and second window panes (8, 9).

2. The double pane window of claim 1, wherein said air dehumidifying channel comprises a channel groove (5) in said metal frame (1).

3. The double pane window of claim 2, wherein said groove (5) is a ring groove in said metal frame, wherein said at least one sealing section (10) covers said ring groove (5), wherein said first air flow port (6) passes through said metal frame (1) into said air dehumidifying groove (5), and wherein said second air flow port (7) passes from said ring groove (5) through said at least one sealing section (10) into said space (13) between said window panes (8,9).

4. The double pane window of claim 3, wherein said metal frame has a bottom and a top, wherein said first air flow port (6) passes through said metal frame at said bottom, and wherein said second air flow port (7) passes through said at least one sealing section (10) at said top of said frame.

5. The double pane window of claim 1, wherein said first air flow port (6) and said second air flow port (7) are positioned at opposite sides of said metal frame (1) away from each other.

6. The double pane window of claim 1, wherein said first air flow port (6) has a first cross-sectional flow area and said second air flow port (7) has a second cross-sectional flow area equal to or larger than said first cross-sectional flow area.

7. The double plane window of claim 1, wherein said air dehumidifying channel (5A) is positioned between said metal frame (1) and said at least one main sealing section (10).

8. The double pane window of claim 7, wherein said air dehumidifying channel (5A) is a ring channel positioned between said mounting section (1A) of said metal frame (1) and said at least one main sealing section (10).

9. The double pane window of claim 8, wherein said mounting section (1A) comprises a ring surface surrounding said ring channel (5A), said ring surface comprising surface elements (1E) facing into said ring channel (5A) for increasing an air flow contact surface area in said air dehumidifying channel.

10. The double pane window of claim 7, comprising an auxiliary sealing section (10A) sealing said air dehumidifying channel (5A) opposite a rim section (1C) of said metal frame (1), said first air flow port (6) passing through said auxiliary sealing section (10A), said second air flow port (7) passing through said main sealing section (10) from said channel (5A) into said space (13) between said window panes (8, 9).

11. The double pane window of claim 10, wherein said first air flow port (6) has a first cross-sectional flow area and said second air flow port (7) has a second cross-sectional flow area equal to or larger than said first cross-sectional flow area.

12. The double pane window of claim 1, wherein said metal frame (1) has a rim section (1C) radially inwardly of said flange section (1B), said rim section (1C) being exposed to the atmosphere outside said fuselage wall (3) when said metal frame (1) is installed in opening (2) in said fuselage wall (3).

13. The double pane window of claim 12, wherein said metal frame (1) comprises a junction (1D) where said mounting section (1A), said flange section (1B), and said rim section (1C) merge into said junction (1D), said channel groove (5) extending into said junction (1D).

14. The double pane window of claim 13, wherein said channel groove (5) extends in said junction (1D) with a slant toward said fuselage wall (3).

* * * * *

UNITED STATES PATENT AND TRADEMARK OFFICE
CERTIFICATE OF CORRECTION

PATENT NO. : 6,168,112 B1 Page 1 of 1
APPLICATION NO. : 09/249460
DATED : January 2, 2001
INVENTOR(S) : Mueller et al.

It is certified that error appears in the above-identified patent and that said Letters Patent is hereby corrected as shown below:

Column 5,
Line 34, after "double", replace "plane" by --pane--.

Signed and Sealed this

Twentieth Day of February, 2007

JON W. DUDAS
*Director of the United States Patent and Trademark Office*